United States Patent [19]
Anderson et al.

[11] 4,084,159
[45] Apr. 11, 1978

[54] SECANT CORRECTION CIRCUIT

[75] Inventors: Wilbert Cleon Anderson, Salt Lake City; Vernal Wynn Thompson, Bountiful; Lawrence Walter Urry, Woods Cross, all of Utah

[73] Assignee: Sperry Rand Corporation, New York, N.Y.

[21] Appl. No.: 719,768

[22] Filed: Sep. 2, 1976

[51] Int. Cl.² .............................................. G01S 9/02
[52] U.S. Cl. ................................ 343/7.4; 343/11 R
[58] Field of Search ............ 343/7.4, 11 R (U.S. only)

[56] References Cited
U.S. PATENT DOCUMENTS

| | | | |
|---|---|---|---|
| 2,715,776 | 8/1955 | Knowles et al. | 343/7.4 X |
| 2,728,075 | 12/1955 | Sunstein | 343/11 R |
| 2,740,962 | 4/1956 | Hammond, Jr. | 343/7.4 |
| 2,784,402 | 3/1957 | Whik et al. | 343/7.4 X |
| 3,377,589 | 4/1968 | Materer et al. | 343/11 R |
| 3,697,992 | 10/1972 | Kleptz et al. | 343/7.4 X |
| 3,886,555 | 5/1975 | Royal | 343/7.4 X |

Primary Examiner—Malcolm F. Hubler
Attorney, Agent, or Firm—John R. Flanagan; Marshall M. Truex

[57] ABSTRACT

An antenna tracking system in which attenuation of gain in the azimuth tracking circuit as a function of the angle of elevation of the antenna is compensated. A correction circuit is provided in the servo loop for amplifying the azimuth error signal and rate gyro signal by an amount equal to the secant of the elevation angle.

3 Claims, 3 Drawing Figures

SECANT CORRECTION CIRCUIT

The Government has rights in this invention pursuant to Contract No. F33657-75-C-0276 awarded by the Department of the Air Force.

BACKGROUD OF THE INVENTION

In antenna systems wherein a target is tracked in two axes, i.e., elevation and azimuth, an inherent problem exists wherein gain in the azimuth tracking servo loop attenuates as the angle of elevation increases. Analysis of the problem has shown that the gain degrades in accordance with the cosine of the angle of elevation. In other words, as the tracking antenna increases its angle of elevation relative to the horizontal, a gain error equivalent to the cosine of the elevation angle is introduced in the azimuth tracking circuit loop which increases as the antenna increases its elevation angle. This error may be compensated for by amplifying the azimuth error input signal by an amount equal to one over the cosine, i.e., the secant of the elevation angle which effectively divides the error out of the system. Where the system also uses gyro feedback to prevent overshoot of the antenna in its azimuth track, the secant of the elevation angle error also appears in the rate gyro feedback voltage and must be compensated for in a similar manner.

This problem of gain stabilization in the azimuth servo loop of a tracking antenna is well known in the art. Heretofore, the problem has been solved by use of a specially configured potentiometer, i.e., one with a winding tapered to correct its input in accordance with the secant function. This potentiomete is normally coupled directly to the gear train of the elevation drive with its output signal introduced into the azimuth servo loop for multiplication of the azimuth servo drive signal by the secant of the elevation angle. Alternately, the secant potentiometer may be located remotely but be mechanically linked to be driven by a servo positioning device that follows the elevation drive assembly.

In either case, such a method requires the mechanical linkage including additional gear trains to accomplish secant correction.

In the secant correction system of the present invention, the mechanical and servo interfaces associated with the secant potentiometer as well as the potentiometer and the long, low level, high impedance leads associated therewith are eliminated. This cumbersome mechanical linkage system is replaced by a purely electronic arrangement wherein the required elevation angle information is obtained directly from the position sensing synchro used in such a two-axis positioning system. The azimuth error signal is passed through an analog multiply/divide device which also receives an input signal representative of the cosine of the elevation angle. The azimuth error signal is then divided by the cosine of the elevation angle, i.e., multiplied by the secant of the elevation angle such that the azimuth error signal is amplitude-modulated according to the secant of the elevation angle. This secant corrected signal is applied to the azimuth drive servo whose gain remains stable as the elevation angle increases.

It should be noted that the present invention provides accurate secant correction for elevation angles between ±86° since correction at near 90°, where the target is essentially overhead, are not possible due to inherent gain limitations. Just as in the case of the secant potentiometer, a trade-off still exists between the range of correctable elevation angles and the signal-to-noise ratio of the azimuth error signal output. As aforesaid, the improvement of the present invention is in the elimination of the mechanical interface with all components being small and located in the vicinity of the circuit element where the error signals originate. Such an arrangement further eliminates degrading of the signal-to-noise ratio of the azimuth error signal caused by long transmission lines between the secant potentiometer and the correction circuitry.

OBJECTS OF THE INVENTION

It is an object of the present invention to provide gain corrected signals in the azimuth servo loop of an antenna tracking system utilizing purely electronic components as opposed to a mechanical linkage system.

It is another object of the present invention to correct the gain azimuth servo loop signals of an antenna tracking system by the secant of the elevation angle without use of a secant potentiometer and its associated long, low level, high impedance signal leads as well as its associated interfacing mechanical linkages.

A further object of the invention is to provide a secant corrected azimuth servo loop signal wherein gain in the azimuth tracking loop is stabilized by use of purely electronic components.

Other objects and many of the attendant advantages of the present invention will become more apparent with reading the following description in conjunction with the attached drawings.

DESCRIPTION OF THE INVENTION

Figure 1:
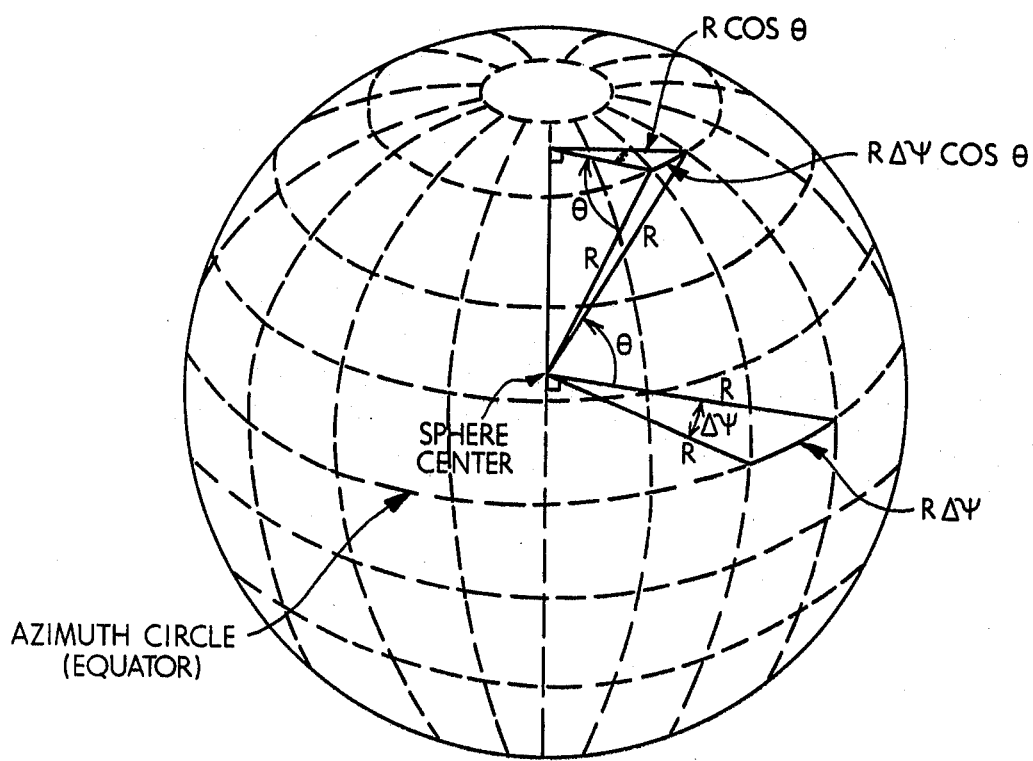
FIG. 1 illustrates a spherical diagram showing the relationships between variations of azimuth arc lengths as the elevation angle increases.

FIG. 1 illustrates a geometrical representation for the purpose of explaining the theoretical necessity of secant correction in the azimuth loop gain.

FIG. 1 shows a sphere having a radius R. An arc length of the sphere is a function of both the elevation angle $\phi$, i.e., the angle of latitude $\phi$ and the change in azimuth angle $\Delta\Psi$, i.e., the difference between longitudes. Thus, if an azimuth angle at the equator or zero degrees elevation is given by $\Delta\Psi$, its arc length is $R \Delta\Psi$. However, at an elevation angle $\phi$, the arc length decreases to $R \Delta\Psi \cos \phi$.

If the error sensor measures a linear displacement from the system pointing angle to the desired tracking angle, as is the case with mutating tracking antennae, the track error will be a constant for any particular elevation angle. Thus, when the sensed information for azimuth error in a physical system is directly proportional to the length of an arc segment on the surface of a sphere as measured parallel to the latitude lines at a particular elevation angle, the true azimuth error signal relative to the sphere equator is obtained by dividing out the cosine of the elevation angle. From trigonometry, it will be remembered that $\cos \phi = 1/\sec \phi$. Therefore, division by the cosine is equal to multiplication by the secant. Therefore, since a two-axis radar antenna system obtains its position error information by scanning a target, the required azimuth motion to force the azimuth error to zero depends on the elevation angle through which the antenna looks at a target. It should be noted that the same physical geometry applies to the azimuth rate gyro which is traditionally mounted on the antenna scanner rather than the trunnion; thus, the sensed rate delivered by such a gyro will also be diminished by the cosine of the elevation angle and must be corrected in the same manner as the azimuth error.

Figure 2:
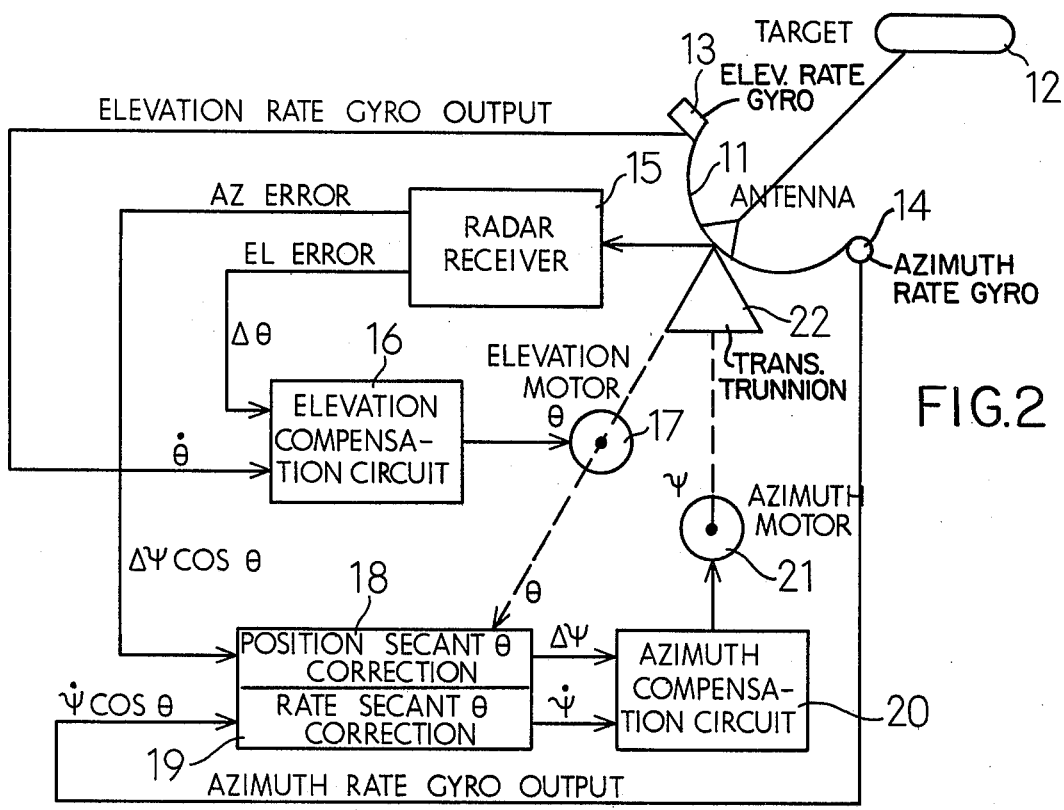
FIG. 2 is a block diagram of an antenna tracking system incorporating the secant correction circuit of the present invention.

Referring now to FIG. 2, there is shown a tracking antenna system employing the secant correction circuitry of the present invention.

An antenna scanner 11 is shown generally as tracking a target 12. Disposed on the antenna scanner 11 is an elevation rate gyro 13 which senses and provides an output proportional to the rate of change of the elevation angle of the antenna scanner 11 or the time rate of change of $\phi$. Also disposed on the antenna scanner 11 is an azimuth rate gyro 14 which senses and provides an output proportional to the rate of change of the azimuth angle of the antenna as measured on the scanner, i.e., the time rate of change for the angle $\Psi \cos \phi$.

The echo pulses received by the antenna scanner 11 from the target 12 are provided as an input to radar receiver 15 which provides a first signal representative of the azimuth error, i.e., the difference in azimuth between the actual line to the target 12 and the line of direction of the antenna scanner 11. The radar receiver 15 provides a second signal representative of the elevation error, i.e., the difference in elevation between the actual line to the target 12 and the line of direction of the antenna scanner.

The signal from the elevation rate gyro 13 is connected to elevation compensation circuit 16 which also receives as an input the elevation error signal from the radar receiver. The elevation compensation and drive circuit 16 provides an output to antenna elevation motor 17. The elevation compensation circuit 16 provides a signal which increases speed of track in elevation to reduce the elevation error $\Delta\phi$ to zero. It also uses the rate gyro input signal as negative feedback as $\Delta\phi$ approaches zero to provide smooth movement to prevent overshoot of the antenna scanner 11 past the target.

While not shown, compensation circuit 16 basically comprises an operational amplifier which mixes the signals representative of position error and velocity error and applies the resultant signal to drive the motor 21 through a power amplifier. Connected between the input and output of the operational amplifier is a resistive/capacitive network to provide negative feedback to compensate for abrupt changes in frequency due to noise by filtering out these extremes of frequency and also keeping gain substantially constant which normally decreases with increases in frequency.

Actual movement of the antenna scanner 11 is obtained through a two-axes translation trunnion symbolically represented by element 22.

The azimuth error or $\Delta\Psi \cos \phi$ from the radar receiver 15 is applied to a position secant correction circuit 18 while the azimuth rate gyro output $\Psi \cos \phi$ from the azimuth rate gyro 14 is applied to a rate secant correction circuit 19 which in effect multiplies the inputs by the secant of the instantaneous elevation angle $\phi$. The elevation angle input to secant correction circuits 18 and 19 is shown as a mechanical input from the elevation motor 17 although it could be electrical, and is in a practical embodiment.

If the azimuth tracking of the antenna were not a function of the elevation angle, secant correction circuits would be unnecessary; and the azimuth compensation circuit 20 would receive the azimuth error signals $\Delta\Psi$ and the azimuth gyro input directly and function similarly to elevation compensation circuit 16.

However, since tracking of the antenna in azimuth bears the relationship to the elevation angle as discussed above, the system requires secant correction for both rate and position.

FIG. 2 is essentially prior art, except insofar as it shows secant correction being accomplished electronically within the system loop and with no secant potentiometer driven by a gear train added to the antenna mechanical drive system.

Figure 3:
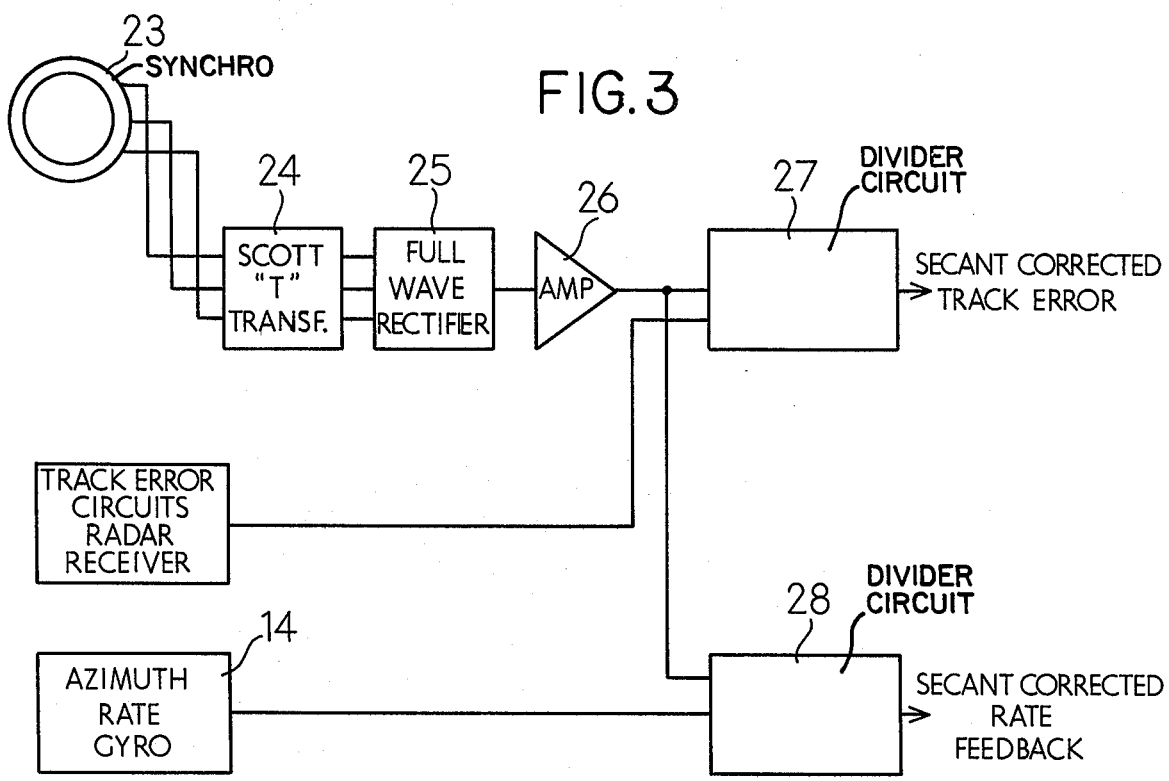
FIG. 3 illustrates a preferred embodiment of the secant correction circuit of the present invention.

FIG. 3 illustrates in block diagram form the position secant correction and the rate secant correction circuits 18 and 19, respectively.

The antenna elevation synchro 23 which is disposed in the gear train of the antenna drive is a conventional device and provides three outputs due to its three-wire configuration. These outputs together are representative of the instantaneous angle of elevation of the antenna scanner 11. The outputs of the antenna elevation synchro 23 are applied to a Scott T transformer 24, where in a well-known manner they are converted into a single signal representative of the cosine of the instantaneous elevation angle $\phi$.

The output from the Scott T transformer 24 is provided as an input to full wave rectifier 25 which converts the AC output from the Scott T transformer 24 into a DC control voltage. This DC control voltage is applied through amplifier 26 to a divider circuit 27.

The divider circuit 27 receives the output from the radar receiver 15 which is proportional to azimuth error, i.e., $\Delta\Psi \cos \phi$ and is divided by the voltage proportional to the cosine of the elevation angle or $\cos \phi$ or multiplied by one over $\cos \phi$ which is the secant of $\phi$. The output of divider 27 is the secant corrected azimuth track error $\Delta\phi$ which is applied to azimuth compensation circuit 20 and used to drive the azimuth motor 21 to move the antenna scanner 11 in azimuth. Thus, the gain, normally attenuated or degraded as the elevation angle increases, is corrected and maintained at its full value of unity so that the antenna is able to meet the requirement of faster tracking in azimuth as the target elevation increases.

In a similar manner, divider circuit 28 receives the input from amplifier 26 proportional to the cosine of the instantaneous elevation angle $\phi$. The divider circuit 28 also receives as an input the output from the azimuth rate gyro 14 where it is divided by the cosine of the elevation angle to provide an output $\Psi$ or the secant corrected rate feedback. This output, which is applied to azimuth motor 21, via azimuth compensation circuit 20 is basically a negative feedback which is used to prevent overshoot of the azimuth motor 21 as it drives the antenna in azimuth. Once the signals $\Psi \cos \phi$ and $\Psi \cos \phi$ are corrected, azimuth compensation circuit 20 functions identically to elevation compensation circuit 16.

Other modifications of the present invention are possible in the light of the above description, and the illustrations of the present invention set forth should not be construed as placing limitations on the present invention other than those limitations contained in the claims which follow.

What is claimed is:

1. An antenna tracking system, comprising:
an antenna;
motor means for moving the antenna in elevation and azimuth;
a radar receiver connected to said antenna for receiving radar echoes from a target and providing an azimuth error signal proportional to the angular difference between target direction and antenna direction;
a synchro connected to said antenna and providing an electrical output proportional to the elevation angle of said antenna;
converter means connected to said synchro for converting the output of said synchro to the cosine function of said elevation angle; and
first divider circuit means connected to said radar receiver for receiving as an input said azimuth error signal and connected to said converter means for receiving as an input said cosine function of said elevation angle and providing an output proportional to said azimuth error signal divided by the cosine of said elevation angle to said motor means.

2. An antenna tracking system according to claim 1 wherein said motor means comprises:

a motor connected to said antenna for driving said antenna in azimuth; and
azimuth compensation means connected between said motor and said first divider circuit means for driving said motor in accordance with the output from said first divider circuit means whereby said antenna is driven in azimuth by the azimuth error signal multiplied by the secant of said elevation angle.

3. An antenna tracking system according to claim 2 further including:

a second divider circuit means connected to said converter means for receiving as an input said cosine function of said elevation angle; and
means connected to said antenna and providing an input to said second divider circuit means proportional to the rate of speed of said antenna in azimuth such that said second divider circuit means provides an output proportional to the tracking speed of the antenna in azimuth multiplied by the secant of said elevation angle to said azimuth compensation means, the latter varying its output signal to said motor in accordance with the size of said azimuth error signal and said azimuth rate signal to prevent overshoot of said motor when said azimuth error signal approaches zero.

* * * * *